July 12, 1966   H. EISENHARDT   3,260,135
ROTARY MECHANISM HAVING PLANETARY GEARING MEANS
Filed July 8, 1963   2 Sheets-Sheet 1

INVENTOR.
HANS EISENHARDT
BY
Thomas W. Kennedy
ATTORNEY

INVENTOR.
HANS EISENHARDT
BY
Thomas W. Kennedy
ATTORNEY

United States Patent Office 3,260,135
Patented July 12, 1966

3,260,135
ROTARY MECHANISM HAVING PLANETARY
GEARING MEANS
Hans Eisenhardt, Neckarsulm, Germany, assignor to NSU
Motorenwerke Aktiengesellschaft, Neckarsulm, Germany, and Wankel G.m.b.H., Gindau, Germany, both
corporations
Filed July 8, 1963, Ser. No. 293,317
Claims priority, application Germany, July 26, 1962,
N 21,899
5 Claims. (Cl. 74—802)

The present invention relates broadly to the art of rotary mechanisms and is particularly directed to index gearing means for such rotary mechanisms.

The invention is particularly useful in connection with rotary mechanisms similar to that disclosed in United States Patent Number 2,988,065, although as will become apparent, this invention is not limited to this specific type of rotary mechanism.

In the following description the invention is described in relation to an internal combustion engine, but the invention is also suitable to other forms of rotary mechanisms such as fluid pumps and fluid motors. A rotary engine as disclosed in said patent comprises an outer body or housing having a cavity therein and an inner body or rotor disposed therein rotatable relative to the outer body, about an axis laterally spaced from, but parallel to the axis of said cavity.

The inner body is journaled on an eccentric portion of a shaft which is co-axial with the outer body and journaled in bearings carried by the outer body end walls. The outer body end walls are axially-spaced end walls and are interconnected by a peripheral wall to form said outer body cavity; the inner surface of the cavity peripheral wall having a multi-lobed profile which preferably is basically an epitrochoid.

The inner body or rotor has end faces carrying end-face seal means and intermediate seal elements disposed adjacent to said outer body end walls for sealing cooperation therewith, and has a peripheral surface with a plurality of circumferentially-spaced apex portions, each carrying a radially-movable seal or seal means for sealing engagement with the multi-lobed inner surface of the outer body peripheral wall to form a plurality of working chambers between the two bodies which vary in volume upon relative rotation of the two bodies. The working chambers of the engine undergo a process of operation, which includes the four phases of intake, compression, expansion and exhaust.

In order to maintain the relative motion and rotary speed-ratio of the inner body relative to the outer body, index gearing means are provided between the inner body and the outer body.

Prior combustion engines of this type have gearing means between the rotor and housing comprising a fixed gear, which is secured to the housing with the eccentric shaft passing through it and which is co-axial with the housing axis, and an internal gear secured to the rotor co-axially with the rotor axis. In a preferred engine design, the diameter of the internal gear is in a 3 to 2 ratio to the diameter of the fixed gear, and the radius of the fixed gear equals twice the offset distance between the shaft and its eccentric portion. With such an engine design in order to obtain a high engine compression ratio, for example, as required for diesel operation, the offset distance and its corresponding fixed gear diameter must be smaller than the corresponding offset distance and fixed gear diameter to obtain an average or lower compression ratio. Since the engine shaft passes through the fixed gear it is clear that only a relatively small diameter and therefore weak shaft is possible in relatively high compression ratio engines.

An object of the present invention comprises the provision of a rotary combustion engine in which a novel index gearing means is provided to maintain the relative motion and the rotary speed-ratio of the inner body relative to the outer body, said gearing permitting the diameter of the engine shaft to be increased by as much as 50%.

Specifically, the invention comprises the provision of gearing means between the rotor and housing comprising a fixed gear secured to the housing and through which the drive shaft passes and a plurality of pinions which are equally spaced about and each of which is in mesh with the fixed gear and each is mounted at its center on a pin to a planet-pinion carrier and is also mounted to the rotor on a second pin which is eccentric to its center pin. For the same size rotor, the fixed gear can be much larger than the fixed gear in the prior art form of gearing means, thereby permitting the use of a larger and stronger shaft.

A further object of the invention comprises the provision of index gearing for a rotary combustion engine such that for a given size engine, the engine shaft diameter need not be made smaller if the engine compression ratio is made larger.

Other objects of the invention will become apparent upon reading the annexed detail description in connection with the drawings in which.

Figure 1:
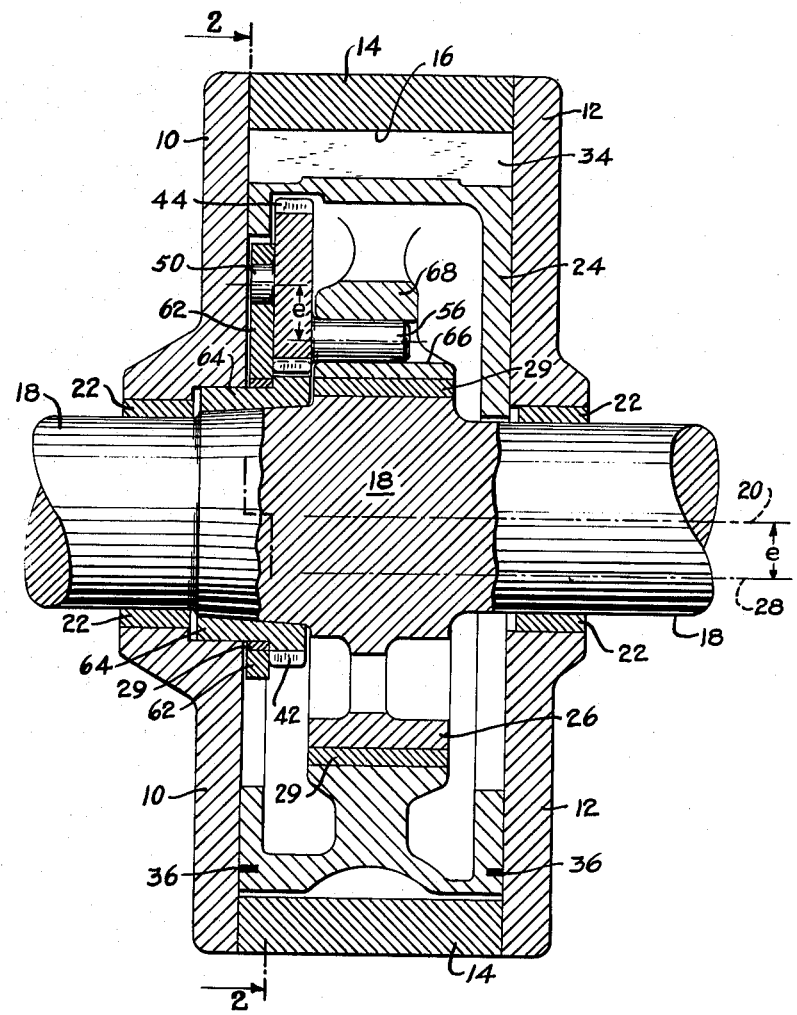
FIG. 1 is a longitudinal sectional view taken along line 1—1 of FIG. 2 and showing a rotary combustion engine embodying the invention.

Referring to the drawings, the housing or outer body of a rotary combustion engine comprises spaced end walls 10 and 12, and a peripheral wall 14 disposed between and interconnecting said end walls to form a cavity therebetween. The inner surface 16 of the peripheral wall 14 preferably has a multi-lobed profile in cross-section which preferably is basically an epitrochoid. With the engine illustrated, the epitrochoid surface 16 has two lobes.

A shaft 18, having an axis 20, which is co-axial with the axis of the outer body cavity and along which the end walls 10 and 12 are spaced, extends through the outer body and is journaled in bearings 22 carried by the end walls 10 and 12. The shaft 18 has an eccentric portion 26 and the rotor 24 has a bearing 29, for rotatably supporting the rotor 24 on the shaft eccentric portion 26. The axis 28 of the inner body 24 and the eccentric 26 is laterally spaced from the shaft axis 20 by the eccentric distance "e."

The inner body 24 is received within the outer body cavity between its end walls 10 and 12 and has a plurality (three in the engine illustrated) of circumferentially-spaced apex portions 30 about its outer periphery to form a plurality of working chambers 32 between the inner and outer bodies which vary in volume upon rotation of the inner body relative to the outer body. The inner body 24 has apex seal means 34 received in an apex groove at each of said apex portions 30 which are in sealing engagement with the peripheral wall inner surface, and end face seal means 36 received in end face grooves at each of its end faces which are in sealing engagement with the end walls 10 and 12.

The outer body has intake port means 38 for supply of an intake charge to the working chambers 32 and has exhaust port means 40 for discharge of exhaust gases from the engine. If desired a spark plug (not shown) may be added adjacent to the waist portion of the inner surface 16 opposite the waist portion between the ports 38 and 40. The rotary speed of the rotor 24 has a 1 to 3 ratio to the rotary speed of the shaft 18 for this rotary combustion engine with a two-lobed housing inner profile 16.

In accordance with the invention, the index gearing for maintaining the motion of the rotor 24 relative to the outer body comprises an external fixed gear 42 secured to the housing end wall 10 (by means not shown) so that the shaft passes through the fixed gear 42. The fixed gear 42 meshes with three circumferentially-spaced planet pinions 44, 46 and 48 disposed thereabout, each of which is rotatably mounted on its geometric axis by pins 50, 52 or 54 to a planet-pinion carrier 62 on its axially outward side. The diameter of each planet pinion 44, 46 and 48 is one-half of the diameter of the fixed gear 42. The planet-pinion carrier 62 is co-axial with the shaft axis 28 and is rotatably mounted on a hub 64 of the gear 42, said hub extending axially from the gear toward the end wall 10 for attachment to said end wall.

Each planet pinion 44, 46 or 48 has an eccentric, shaft-like stud pin 56, 58 or 60 on its axially inward side having an axis, which is offset by a distance equal to the eccentricity "e" from the geometric axis of the associated pin 50, 52 or 54. Each eccentric stud pin 56, 58 or 60 is journaled in a matching bearing hole 66 in the rotor web 68. Thus, each planet pinion 44, 46 and 48 is rotatably mounted both in the carrier 62 and also in the rotor 24.

During the rotation of the rotor 24, each point on the rotor describes a trochoidal path since its eccentricity "e" is constant and its generating radius equals the distance from said point on the rotor to the rotor axis 28. The rotor 24 is kinematically stable, that is, its motion relative to the outer body is properly maintained, if it is guided by at least one such generating point. Thus, the rotor 24 is kinematically stable if at least one planet pinion 44, 46 or 48 is in engagement with the fixed gear 42.

In rotary combustion engines with a housing inner profile in the shape of a two-lobed epitrochoid, the diameter of the fixed gear 42 is two times the diameter of each planet pinion 44, 46 and 48. The diameter of the fixed gear 42 is limited only by the space available in the rotor 24. As the eccentricity "e" is reduced, for example to provide higher compression rations, the outer profile of the rotor 24 bulges outwardly to a greater extent between its apex portions 30 whereby the space available inside the rotor 24 is increased. In this way, with similar size engines, the one having the smaller eccentricity can use a larger fixed gear 42 than the one having the larger eccentricity. This is exactly the reverse from the situation in rotary engines having the prior art form of index gearing comprising an internal gear and fixed gear. Thus, in a rotary engine having the index gearing of the present invention, as the eccentricity between the engine shaft and its eccentric portion is reduced, its shaft diameter can be increased.

Figure 2:
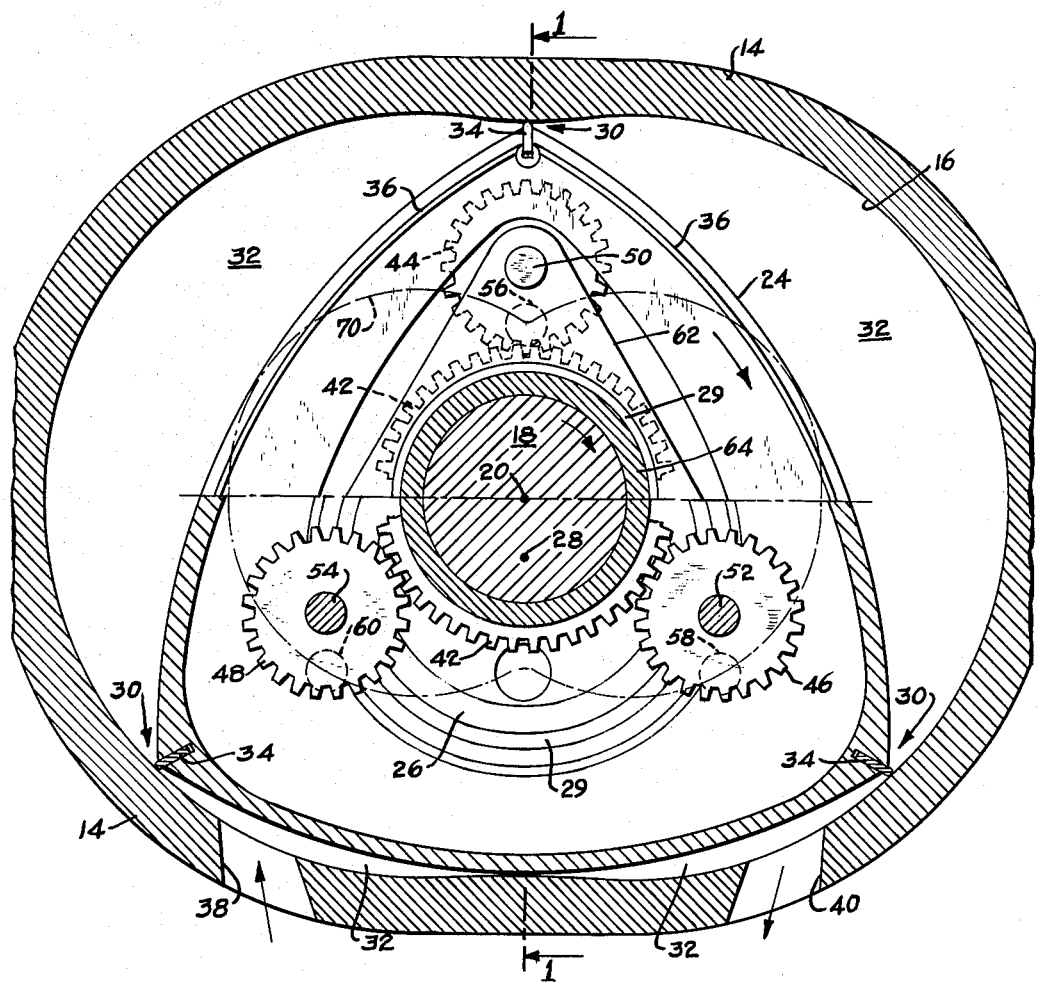
FIG. 2 is a transverse sectional view as taken along line 2—2 of FIG. 1.

As illustrated in FIG. 2, the axis of each eccentric pin 56, 58 or 60 is preferably disposed in a radial plane extending from the rotor axis 28 and through the middle of its apex portion 30 so that said rotor guiding pins 56, 58 and 60 are located as close as possible to the rotor apex portions 30, these pins traveling, during engine operation, along the path 70 shown by a dot-dash line which corresponds to a true epitrochoidal shape. Hence, the tip of each apex portion and its seal also traces an epitrochoidal path. With each pinion eccentric pin 56, 58 and 60 disposed as close as possible to its apex portion 30, play or movement of the rotor apex portions, because of possible clearance between the gear teeth, is minimized.

Moreover, with each planet pinion 44, 46 and 48 disposed as close as possible to its apex portion 30, the fixed gear 42 can be made as large as possible. Thus, the shaft diameter can be made as large as possible.

In addition with the index gearing described, the lever arm of the rotor forces acting on the planet pinions 44, 46 and 48, as a result of unsymmetrical forces on the rotor 24, is minimized.

It is possible to finish-machine the external teeth of the pinions 44, 46 and 48 and fixed gear 42 by grinding, while this is not as easily accomplished, nor always possible, with the internal teeth of the prior art form of gear particularly below a certain minimum gear teeth diameter. Thus, the use of the planetary type of gearing of this invention facilitates manufacture.

In the engine illustrated in FIGS. 1 and 2, the planet-pinion carrier 62 rotates at a speed which is one-third of the rotary speed of the shaft 18. If desired, a separate auxiliary drive shaft may be coupled to the carrier 62.

While I have described my invention in detail in its present preferred embodiment it will be obvious to those skilled in the art after understanding my invention that various changes and modifications may be made therein without departing from the spirit or scope thereof. It is intended by the appended claims to cover all such modifications.

What is claimed is:

1. A rotary mechanism comprising an outer body having spaced end walls and a peripheral wall forming a cavity therebetween having an axis along which the end walls are spaced; a shaft coaxial with said cavity and having an eccentric portion with an axis spaced from and parallel to said outer body axis and planetating therearound; an inner body journaled on said eccentric portion for rotation therearound relative to said outer body and having a plurality of circumferentially-spaced apex portions disposed in sealing cooperation with the inner surface of said peripheral wall to form a plurality of working chambers between said bodies which vary in volume upon such relative rotation; gear means interconnecting said inner and outer bodies and allowing said inner body to rotate around said eccentric axis and to planetate therewith about said outer body axis; said gear means comprising a gear secured to said outer body and non-rotatable relative thereto and coaxially disposed about said shaft, a planet-carrier member supported for rotation about said shaft axis, at least one planet pinion disposed in mesh with said gear and journaled by said planet-carrier for rotation about the geometric axis of said pinion, and rotatable journal means supporting said pinion on said inner body on an axis eccentric to said pinion axis, said eccentric journal axis planetating about said pinion axis.

2. A rotary mechanism as claimed in claim 1 and in which the eccentricity of the axes of the shaft and shaft eccentric portion is equal to the eccentricity of said pinion axis and said journal axis.

3. A rotary mechanism as claimed in claim 1 and in which the pitch diameter of each planet pinion is one-half the pitch diameter of said gear and in which the inner surface of the outer body is basically a two-lobed epitrochoid.

4. A rotary mechanism as claimed in claim 1 and in which said eccentric journal axis of each planet pinion is disposed in a radial plane including the rotor axis and an apex portion of the inner body.

5. A rotary mechanism as claimed in claim 4 and in which there is one planet pinion for each apex portion of the inner body.

References Cited by the Examiner

UNITED STATES PATENTS

| | | | |
|---|---|---|---|
| 72,792 | 12/1867 | Browne | 74—805 |
| 377,133 | 1/1888 | Arnold | 74—802 |
| 2,390,229 | 12/1945 | Thompson | 74—804 X |
| 2,691,365 | 10/1954 | Lehmann | 91—56 |
| 2,988,065 | 6/1961 | Wankel et al. | 74—805 X |
| 3,064,880 | 11/1962 | Wankel et al. | 123—8 |

FOREIGN PATENTS

| | | |
|---|---|---|
| 129,805 | 10/1932 | Austria. |
| 76,772 | 3/1933 | Sweden. |

DAVID J. WILLIAMOWSKY, *Primary Examiner.*

BRAUGHTON G. DURHAM, *Examiner.*

T. C. PERRY, *Assistant Examiner.*